US012793976B2

(12) United States Patent
Kong et al.

(10) Patent No.: US 12,793,976 B2
(45) Date of Patent: Nov. 10, 2026

(54) POSITIVE ACTIVE MATERIAL FOR RECHARGEABLE LITHIUM BATTERY, POSITIVE ELECTRODE FOR RECHARGEABLE LITHIUM BATTERY AND RECHARGEABLE LITHIUM BATTERY

(71) Applicant: SAMSUNG SDI CO., LTD., Yongin-si (KR)

(72) Inventors: Youngsun Kong, Yongin-si (KR); Wonmo Seong, Yongin-si (KR); Seok Mun Kang, Yongin-si (KR); Naoyuki Hase, Yongin-si (KR); Jaesang Yoon, Yongin-si (KR); Do-Wook Jun, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 621 days.

(21) Appl. No.: 18/153,080

(22) Filed: Jan. 11, 2023

(65) Prior Publication Data

US 2023/0387406 A1 Nov. 30, 2023

(30) Foreign Application Priority Data

May 30, 2022 (KR) ........................ 10-2022-0066266

(51) Int. Cl.
*H01M 4/525* (2010.01)
*C01G 53/50* (2025.01)
(Continued)

(52) U.S. Cl.
CPC ............ *H01M 4/525* (2013.01); *C01G 53/50* (2013.01); *H01M 4/505* (2013.01); (Continued)

(58) Field of Classification Search
CPC .............................................. H01M 2004/028
See application file for complete search history.

(56) References Cited

U.S. PATENT DOCUMENTS

2010/0081055 A1* 4/2010 Konishi ............ H01M 10/0525 429/223
2014/0377659 A1 12/2014 Oljaca et al.
(Continued)

FOREIGN PATENT DOCUMENTS

CN 110620216 A 12/2019
CN 110857224 A 3/2020
(Continued)

OTHER PUBLICATIONS

Extended European Search Report dated Nov. 6, 2023 issued in corresponding European Patent Application No. 23151269.0, 6 pages.
(Continued)

*Primary Examiner* — Dah-Wei D. Yuan
(74) *Attorney, Agent, or Firm* — Womble Bond Dickinson (US) LLP

(57) ABSTRACT

A positive active material for rechargeable lithium batteries is provided to include: a first positive active material including a layered cobalt-free lithium nickel-based composite oxide, being in a form of a secondary particle in which a plurality of primary particles are aggregated, and having an average particle diameter of about 8 μm to about 20 μm; and a second positive active material including a layered cobalt-free lithium nickel-based composite oxide, being in a form of a single particle, and having an average particle diameter of about 1 μm to about 7 μm, wherein a molar amount of nickel based on the total molar amount of elements excluding lithium and oxygen in the second positive active material is about 1 mol % to about 10 mol % more than a molar amount of nickel based on the total molar amount of elements excluding lithium and oxygen in the first positive active material.

21 Claims, 6 Drawing Sheets

(51) Int. Cl.
*H01M 4/505* (2010.01)
*H01M 10/0525* (2010.01)
*H01M 4/02* (2006.01)

(52) U.S. Cl.
CPC ..... *H01M 10/0525* (2013.01); *C01P 2002/54* (2013.01); *C01P 2004/03* (2013.01); *C01P 2004/32* (2013.01); *C01P 2004/53* (2013.01); *C01P 2004/61* (2013.01); *C01P 2006/40* (2013.01); *H01M 2004/021* (2013.01); *H01M 2004/028* (2013.01)

(56) References Cited

U.S. PATENT DOCUMENTS

| | | | |
|---|---|---|---|
| 2019/0393479 A1 | 12/2019 | Kim et al. | |
| 2020/0067090 A1 | 2/2020 | Hong et al. | |
| 2021/0135215 A1 | 5/2021 | Kil | |
| 2021/0167365 A1 | 6/2021 | Kim et al. | |
| 2021/0167366 A1 | 6/2021 | Leng et al. | |
| 2021/0296638 A1 | 9/2021 | Kintsu et al. | |
| 2021/0305564 A1* | 9/2021 | Manthiram | H01M 4/382 |
| 2021/0331938 A1 | 10/2021 | Fold Von Bulow | |
| 2022/0093913 A1 | 3/2022 | Ahn et al. | |
| 2022/0140338 A1 | 5/2022 | Ahn et al. | |
| 2023/0109315 A1 | 4/2023 | Jang et al. | |
| 2023/0155123 A1 | 5/2023 | Lee et al. | |
| 2023/0197944 A1 | 6/2023 | Tabushi et al. | |
| 2023/0335713 A1 | 10/2023 | Qiao et al. | |

FOREIGN PATENT DOCUMENTS

| | | | | |
|---|---|---|---|---|
| CN | 112151794 A | | 12/2020 | |
| CN | 112751025 A | | 5/2021 | |
| CN | 113903895 A | | 1/2022 | |
| CN | 113998745 A | | 2/2022 | |
| CN | 114556614 A | | 5/2022 | |
| CN | 114864867 A | * | 8/2022 | H01M 4/485 |
| JP | 2021-150051 A | | 9/2021 | |
| JP | 2023-501071 | | 1/2023 | |
| JP | 2023-26409 A | | 2/2023 | |
| JP | 2023-91566 A | | 6/2023 | |
| KR | 10-2014-0098424 A | | 8/2014 | |
| KR | 10-2019-0041715 A | | 4/2019 | |
| KR | 10-2019-0133456 A | | 12/2019 | |
| KR | 10-2021-0079178 A | | 6/2021 | |
| KR | 10-2022-0040933 A | | 3/2022 | |
| KR | 10-2022-0057352 A | | 5/2022 | |
| WO | WO 2021/195524 A1 | | 9/2021 | |
| WO | WO 2023/054308 A1 | | 4/2023 | |

OTHER PUBLICATIONS

Korean Notice of Allowance dated Sep. 10, 2024 issued in corresponding KR Patent Application No. 10-2022-0066266, 3 pages.
Japanese Office action dated Mar. 4, 2024 issued in corresponding Japanese Patent Application No. 2023-001337, 3 pages.
Chinese Notification of First Office Action, for CN Patent Application No. 202310034983.X, dated Apr. 3, 2026, 8 pages.

* cited by examiner

POSITIVE ACTIVE MATERIAL FOR RECHARGEABLE LITHIUM BATTERY, POSITIVE ELECTRODE FOR RECHARGEABLE LITHIUM BATTERY AND RECHARGEABLE LITHIUM BATTERY

CROSS-REFERENCE TO RELATED APPLICATION

This application claims priority to and the benefit of Korean Patent Application No. 10-2022-0066266, filed in the Korean Intellectual Property Office on May 30, 2022, the entire content of which is incorporated herein by reference.

BACKGROUND

1. Field

One or more aspects of embodiments of the present disclosure relate to a positive active material for a rechargeable lithium battery, a positive electrode for a rechargeable lithium battery including the same, and a rechargeable lithium battery including the same.

2. Description of the Related Art

A portable information device such as a cell phone, a laptop, smart phone, and/or the like or an electric vehicle has utilized a rechargeable lithium battery having high energy density and easy portability as a driving power source. Recently, research has been actively conducted to utilize a rechargeable lithium battery with high energy density as a driving power source or power storage power source for hybrid or electric vehicles.

In order to meet these uses, positive active materials capable of realizing high-capacity, high stability, and long cycle-life performance are being studied. In general, ternary-based positive active materials of Ni, Co, and Mn or Ni, Co, and Al are utilized. However, as a demand for large or high-capacity rechargeable lithium batteries is rapidly increasing in recent years, positive active materials containing cobalt, a rare metal, are expected to be short of supply. In other words, because the cobalt is expensive, and not many reserves thereof remain, in order to manufacture large or high-capacity batteries and/or the like, development of a cobalt-free positive active material is desired. Because the cobalt plays a key role in forming a positive active material structure, when the cobalt is removed, the positive active material may have structural defects, which cause problems of increasing resistance, inability (or lower ability) of securing a long cycle-life, and deteriorating performance such as capacity, efficiency, and/or the like.

Suitable cobalt-free positive active materials in the related art have an olivine-based crystal structure such as lithium iron phosphate (LFP), lithium manganese phosphate (LMP), lithium manganese iron phosphate (LMFP), or a spinel crystal structure such as lithium manganese oxide (LMO), which are not a layered structure. These cobalt-free positive active materials have high structural stability but a structural limitation of low capacity due to low lithium availability. Cobalt-free positive active materials with a layered structure may structurally have a relatively large lithium content (e.g., amount) and thus exhibit excellent or suitable capacity and efficiency characteristics and accordingly, may be suitable as a material for a high-capacity battery but is structurally unstable, hardly securing long cycle-life characteristics. Therefore, development of a layered cobalt-free positive active material capable of realizing high capacity and securing improved structural stability and concurrently (e.g., simultaneously) improving capacity, efficiency, and/or cycle-life characteristics of a rechargeable lithium battery is highly desired.

SUMMARY

One or more aspects of embodiments of the present disclosure are directed toward a positive active material including a layered cobalt-free positive active material, a positive electrode including the positive active material, and a rechargeable lithium battery including the positive electrode. The positive active material, including a layered cobalt-free positive active material, may secure capacity and efficiency characteristics, suppress or reduce structural deterioration caused by charging and discharging, and concurrently improve cycle-life characteristics of the rechargeable lithium battery.

Additional aspects will be set forth in part in the description which follows and, in part, will be apparent from the description, or may be learned by practice of the presented embodiments.

According to one or more embodiments, a positive active material for a rechargeable lithium battery may include a first positive active material including a layered cobalt-free lithium nickel-based composite oxide, being in a form of a secondary particle in which a plurality of primary particles are aggregated, and having an average particle diameter (D50) of about 8 μm to about 20 μm; and a second positive active material including a layered cobalt-free lithium nickel-based composite oxide, being in a form of a single particle, and having an average particle diameter (D50) of about 1 μm to about 7 μm, wherein a molar amount of nickel based on the total molar amount of elements excluding lithium and oxygen in the second positive active material is about 1 mol % to about 10 mol % more than a molar amount of nickel based on the total molar amount of elements excluding lithium and oxygen in the first positive active material.

According to one or more embodiment, a positive electrode for a rechargeable lithium battery may include a current collector and a positive active material layer on the current collector, wherein the positive active material layer may include the aforementioned positive active material.

According to one or more embodiments, a rechargeable lithium battery may include a positive electrode including the aforementioned positive active material, a negative electrode, and an electrolyte.

The positive active material for a rechargeable lithium battery according to one or more embodiments of the present disclosure as a layered cobalt-free positive active material may concurrently (e.g., simultaneously) secure capacity, efficiency, and cycle-life characteristics of the rechargeable lithium battery.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
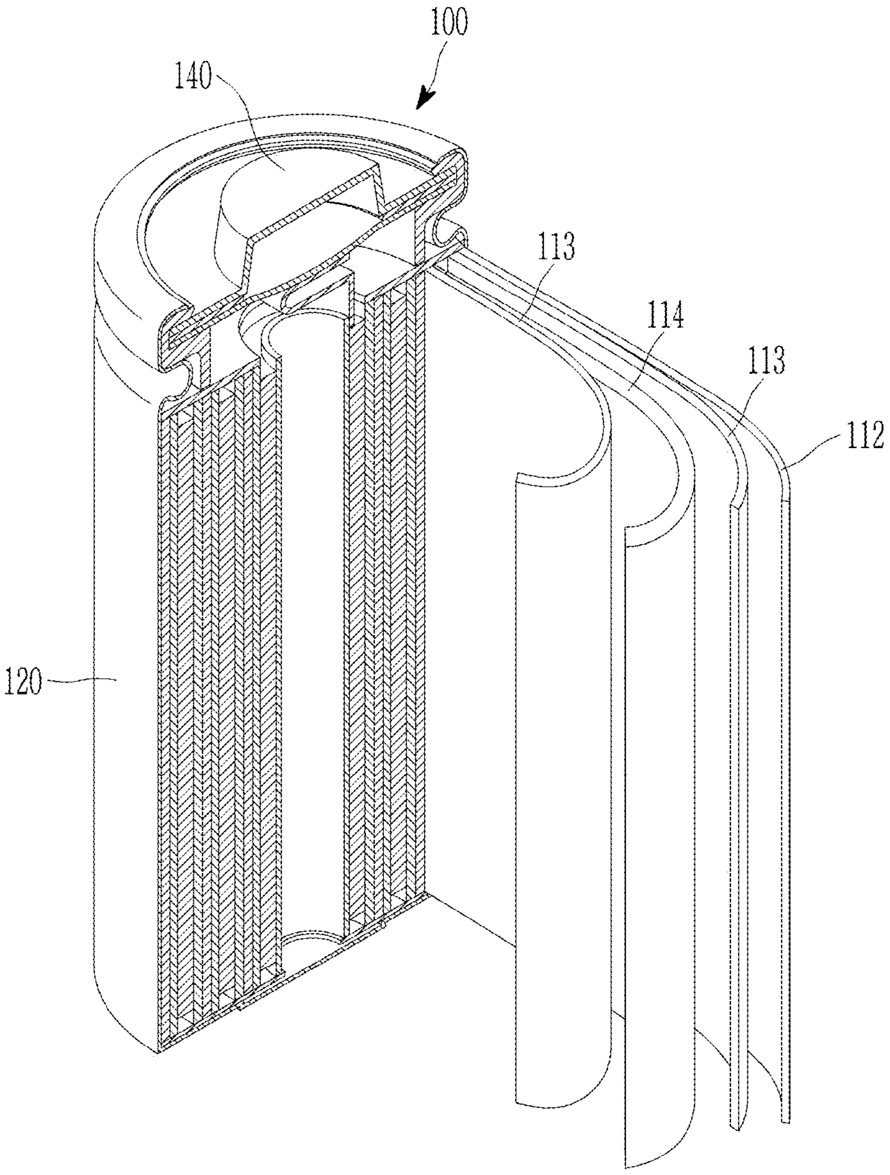
FIG. 1 is a schematic view illustrating a rechargeable lithium battery according to one or more embodiments of the present disclosure.

Hereinafter, specific embodiments will be described in more detail so that those of ordinary skill in the art can easily implement them. However, this disclosure may be embodied in many different forms and is not construed as limited to the example embodiments set forth herein.

The terminology utilized herein is utilized to describe embodiments only and is not intended to limit the present disclosure. The singular expression includes the plural expression unless the context clearly dictates otherwise.

As utilized herein, "combination thereof" may refer to a mixture, laminate, composite, copolymer, alloy, blend, reaction product, and/or the like of the constituents.

Herein, it should be understood that terms such as "comprise(s)," "include(s)," or "have/has" are intended to designate the presence of an embodied feature, number, step, element, or a combination thereof, but it does not preclude the possibility of the presence or addition of one or more other features, numbers, steps, elements, or a combination thereof.

In the drawings, the thickness of layers, films, panels, regions, etc., may be exaggerated for clarity and like reference numerals designate like elements throughout the present disclosure, and duplicative descriptions thereof may not be provided for conciseness. It will be understood that when an element such as a layer, film, region, or substrate is referred to as being "on" another element, it can be directly on the other element or intervening elements may also be present. In contrast, when an element is referred to as being "directly on" another element, there are no intervening elements present.

In some embodiments, "layer" herein includes not only a shape or layer formed on the whole surface when viewed from a plan view, but also a shape or layer formed on a partial surface.

In some embodiments, the average particle diameter may be measured by a method well suitable to those skilled in the art, for example, may be measured by a particle size analyzer, for example, HORIBA, LA-950 laser particle size analyzer, or may be measured by an optical microscope image such as a transmission electron micrograph or a scanning electron micrograph. In some embodiments, it is possible to obtain an average particle diameter value by measuring utilizing a dynamic light scattering method, performing data analysis, counting the number of particles for each particle size range, and calculating from the data. Unless otherwise defined, the average particle diameter may refer to the diameter (D50) of particles having a cumulative volume of 50 volume % in the particle size distribution. D50 refers to the average diameter (or size) of particles whose cumulative volume corresponds to 50 vol % in the particle size distribution (e.g., cumulative distribution), and refers to the value of the particle size corresponding to 50% from the smallest particle when the total number of particles is 100% in the distribution curve accumulated in the order of the smallest particle size to the largest particle size. In the present disclosure, when particles are substantially spherical, "diameter" indicates an average particle diameter, and when the particles are non-spherical, the "diameter" indicates a major axis length.

Herein, "or" is not to be construed as an exclusive meaning, for example, "A or B" is construed to include A, B, A+B, and/or the like. Further, as used herein, the term "and/or" includes any and all combinations of one or more of the associated listed items. Expressions such as "at least one of," "one of," and "selected from," when preceding a list of elements, modify the entire list of elements and do not modify the individual elements of the list.

As used herein, the singular forms "a," "an," and "the" are intended to include the plural forms as well, unless the context clearly indicates otherwise. Further, the use of "may" when describing embodiments of the present disclosure refers to "one or more embodiments of the present disclosure".

Positive Active Material

In one or more embodiments, a positive active material for a rechargeable lithium battery may include a first positive active material including a layered cobalt-free lithium nickel-based composite oxide, being in a form of a secondary particle in which a plurality of primary particles are aggregated, and having an average particle diameter (D50) of about 8 μm to about 20 μm; and a second positive active material including a layered cobalt-free lithium nickel-based composite oxide, being in a form of a single particle, and having an average particle diameter (D50) of about 1 μm to about 7 μm, wherein a molar amount of nickel based on the total molar amount of elements excluding lithium and oxygen in the second positive active material is about 1 mol % to about 10 mol % more than a molar amount of nickel based on the total molar amount of elements excluding lithium and oxygen in the first positive active material.

In general, cobalt is utilized in order to stably maintain a layered structure of a positive active material, but embodiments of the present disclosure provide a method of maintaining and stabilizing the layered structure without utilizing the cobalt.

As described above, due to an increasing demand for high-capacity rechargeable lithium batteries and with the depletion of cobalt, which is a rare metal, development of a cobalt-free positive active material and in particular, a layered cobalt-free positive active material capable of realizing high capacity is highly desired. In general, a layered cobalt-free positive active material has a problem of structural deterioration due to charges and discharges, but according to one or more embodiments of the present disclosure, the layered structure is physically maintained by introducing a single particle form thereinto. However, the single particle form (that is, the second positive active material), in order to compensate for a problem of a low lithium diffusion rate, is introduced or formed into small particles having an average particle diameter of about 1 μm to about 7 μm and, in some embodiment, about 2 μm to about 5 μm. Accordingly, long-term cycle-life characteristics of the rechargeable lithium battery may be secured by balancing lithium migration rates of the first and second positive active materials and equally dividing a degree of deterioration of the cobalt-free positive active material into a polycrystal structure and a single crystal structure.

However, a positive active material in the form of a single particle has a short lithium migration path, excellent or suitable crystal structure orientation, and high structural stability and thus excellent or suitable cycle-life characteristics, but because the lithium migration path is limited, and a specific surface area is small, capacity and efficiency thereof with the same composition are inferior In one or more embodiments, in order to solve the above referenced trade-off characteristic(s), the second positive active material, which is (i.e., which includes or is formed of) small particles in the form of a single particle, is designed to have a higher nickel concentration of about 1 mol % to about 10 mol % than the first positive active material, which is (i.e., which includes or is formed of) large particles, thereby balancing deterioration characteristics of the small particles into those of the large particles to secure long cycle-life characteristics without deteriorating capacity and efficiency.

For example, when the nickel concentration of the first positive active material has a difference of less than about 1 mol % from that of the second positive active material, for example, when the nickel concentration of the first positive active material is the same as or higher than that of the second positive active material, the second positive active material may have a problem of deteriorated lithium availability and thereby, deteriorated capacity, resulting in an imbalance in capacity and deterioration rates between the large and small particles, and thus just slightly improving cycle-life characteristics.

In other words, in the battery field, because capacity, efficiency, and cycle-life characteristics are in a trade-off relationship with one another, it is common to lose one to obtain other characteristics, but one or more embodiments of the present disclosure provide a method of concurrently (e.g., simultaneously) securing the capacity, efficiency, and cycle-life characteristics without the trade-off.

The positive active material for a rechargeable lithium battery may be a layered cobalt-free positive active material, a cobalt-free nickel-based positive active material, or a cobalt-free nickel-manganese-based positive active material. The cobalt-free may refer to that there is substantially no cobalt, cobalt is not utilized, or only a very small amount of cobalt is utilized. In some embodiments, the aforementioned single particle form may refer to that particles are not structurally aggregated with one another but independently present in a morphology phase and exist alone without a grain boundary within a particle and are respectively composed of a single particle. The aforementioned single particle may be expressed as a monolithic structure, a non-aggregated particle, a monolith structure, and/or the like and may be monocrystalline.

In one or more embodiments, the first positive active material in the form of a secondary particle has an average particle diameter of about 8 μm to about 20 μm, and the second positive active material in the form of a single particle may have an average particle diameter of about 1 μm to about 7 μm. Herein, the average particle diameter may refer to a diameter of particles at a cumulative volume of about 50 volume %, that is, D50 in a particle distribution. The average particle diameter may be measured through an optical microscope image taken by utilizing a scanning electron microscope (SEM), a transmission electron microscope (TEM), and/or the like. For example, about 30 particles each in the form of a secondary particle are randomly selected from the scanning electron microscope image of the positive active material and then, measured with respect to sizes (particle diameters or lengths of long axis) to obtain a particle distribution, wherein D50 is taken as an average particle diameter of the first positive active material. In some embodiments, about 30 particles are randomly selected from single particles shown in the scanning electron microscope image of the second positive active material and then, measured with respect to (particle diameter or length of long axis) to obtain a particle distribution, wherein D50 is calculated as an average particle diameter of the second positive active material.

The average particle diameter of the first positive active material may be, for example, about 9 μm to about 19 μm, about 10 μm to about 18 μm, or about 11 μm to about 17 μm. The average particle diameter of the second positive active material may be, for example, about 1 μm to about 6 μm, about 1 μm to about 5 μm, or about 2 μm to about 4 μm. When each average particle diameter satisfies the ranges, a rechargeable lithium battery cell including the same may realize high density and high energy density, concurrently (e.g., simultaneously) improving capacity, efficiency, and cycle-life characteristics of the rechargeable lithium battery.

In some embodiments, a method of measuring a molar amount of nickel may be performed by quantitively analyzing an amount of nickel based on the total amount of elements excluding lithium and oxygen through energy dispersive X-ray spectroscopy (EDS) in the scanning electron microscope image of the positive active material to obtain the amount of nickel in an atom % unit and converting the atom % unit into mol % unit. Herein, in the scanning electron microscope image of the positive active material, about 30 particles each in the form of a secondary particle from the first positive active material are taken to calculate each nickel content (e.g., molar amount) thereof and then, calculating an arithmetic average thereof as "the molar amount of nickel based on the total molar amount of elements excluding lithium and oxygen in the first positive active material," and in addition, about 30 particles each in the form of a single particle in the scanning electron microscope image of the second positive active material are taken to calculate each nickel content (e.g., molar amount) thereof and calculate an arithmetic average thereof as "the molar amount of nickel based on the total molar amount of elements excluding lithium and oxygen in the second positive active material."

The method of measuring the nickel content (e.g., molar amount) may utilize Inductively Coupled Plasma-Mass Spectrometry (ICP-MS), Inductively Coupled Plasma Optical Emission Spectroscopy (ICP-OES), and/or the like in addition to SEM-EDS.

In one or more embodiments, a difference of "the molar amount of nickel based on the total molar amount of elements excluding lithium and oxygen in the first positive active material" subtracted from "the molar amount of nickel based on the total molar amount of elements excluding lithium and oxygen in the second positive active material" satisfies about 1 mol % to about 10 mol %. A difference of the nickel concentration of the first positive active material subtracted from that of the second positive active material may be, for example, about 2 mol % to about 10 mol %, about 3 mol % to about 10 mol %, about 4 mol % to about 9 mol %, or about 1 mol % to about 8 mol %. The layered cobalt-free positive active material designed in this way is utilized to concurrently (e.g., simultaneously) improve capacity, efficiency, and cycle-life of a rechargeable lithium battery.

The layered cobalt-free lithium nickel-based composite oxide of the first positive active material may be, for example, represented by Chemical Formula 1.

Chemical Formula 1

$$Li_{x1}Ni_{a1}Mn_{b1}M^1_{(1-a1-b1)}O_2$$

In Chemical Formula 1, $M^1$ is at least one element selected from aluminum (Al), boron (B), barium (Ba), calcium (Ca), cerium (Ce), chromium (Cr), copper (Cu), fluorine (F), iron (Fe), magnesium (Mg), molybdenum (Mo), niobium (Nb), phosphorous (P), sulfur (S), silicon (Si), strontium (Sr), titanium (Ti), vanadium (V), tungsten (W), and zirconium (Zr), $0.9 \leq x1 \leq 1.2$, $0.6 \leq a1 \leq 1$, and $0 \leq b1 \leq 0.4$.

In Chemical Formula 1 $0.6 \leq a1 \leq 0.99$ and $0.01 \leq b1 \leq 0.4$, $0.6 \leq a1 \leq 0.90$ and $0.10 \leq b1 \leq 0.4$, $0.6 \leq a1 \leq 0.85$ and $0.15 \leq b1 \leq 0.4$, $0.6 \leq a1 \leq 0.80$ and $0.20 \leq b1 \leq 0.4$, or $0.7 \leq a1 \leq 0.90$ and $0.10 \leq b1 \leq 0.3$.

The layered cobalt-free lithium nickel-based composite oxide of the second positive active material may be, for example, represented by Chemical Formula 2.

$$Li_{x2}Ni_{a2}Mn_{b2}M^2_{(1-a2-b2)}O_2$$

In Chemical Formula 2, $M^2$ is at least one element selected from Al, B, Ba, Ca, Ce, Cr, Cu, F, Fe, Mg, Mo, Nb, P, S, Si, Sr, Ti, V, W, and Zr, $0.9 \leq x2 \leq 1.2$, $0.6 \leq a2 \leq 1$, and $0 \leq b2 \leq 0.4$.

In Chemical Formula 2, $0.6 \leq a2 \leq 0.99$ and $0.01 \leq b2 \leq 0.4$, $0.6 \leq a2 \leq 0.90$ and $0.10 \leq b2 \leq 0.4$, $0.6 \leq a2 \leq 0.85$ and $0.15 \leq b2 \leq 0.4$, $0.6 \leq a2 \leq 0.80$ and $0.20 \leq b2 \leq 0.4$, or $0.7 \leq a2 \leq 0.90$ and $0.10 \leq b2 \leq 0.3$.

According to one or more embodiments, because the molar amount of nickel based on the total molar amount of elements excluding lithium and oxygen in the second positive active material is about 1 mol % to about 10 mol % more than the molar amount of nickel based on the total molar amount of elements excluding lithium and oxygen in the first positive active material, in the relationship between Chemical Formula 1 and Chemical Formula 2, $0.02 \leq (a2-a1) \leq 0.10$ may be established, for example, $0.04 \leq (a2-a1) \leq 0.10$, $0.05 \leq (a2-a1) \leq 0.10$, or $0.02 \leq (a2-a1) \leq 0.80$ may be satisfied. Under such a relationship, it is possible to concurrently (e.g., simultaneously) improve capacity, efficiency, and cycle-life characteristics of a rechargeable ion battery even while applying a layered cobalt-free positive active material.

In one or more embodiments, the first positive active material in the form of a secondary particle may have, for example, a substantially spherical shape or a shape close to a spherical shape. For example, in some embodiment, the first positive active material may include substantially spherically shaped secondary particles. In addition, the second positive active material in the form of a single particle may have, for example, a polyhedral shape, a substantially spherical shape, and/or shapeless (e.g., an irregular shape). For example, in some embodiments, the second positive active material may include polyhedrally shaped, substantially spherically shaped, and/or irregularly shaped single particles. Terms such as "shapeless" and "irregular shape" and the similar used herein may refer to a shape which has sides and angles of different lengths and sizes.

In one or more embodiments, the positive active material for a rechargeable lithium battery may include about 65 wt % to about 95 wt % of the first positive active material and about 5 wt % to about 35 wt % of the second positive active material. For example, the positive active material for the rechargeable lithium battery may include about 65 wt % to about 90 wt % of the first positive active material and about 10 wt % to about 35 wt % of the second positive active material; about 70 wt % to about 90 wt % of the first positive active material and about 10 wt % to about 30 wt % of the second positive active material; or about 70 wt % to about 80 wt % of the first positive active material and about 20 wt % to about 30 wt % of the second positive active material. When the above mixing ratio is satisfied, capacity, efficiency, and cycle-life characteristics of the rechargeable lithium battery may be concurrently (e.g., simultaneously) improved even while applying the layered cobalt-free positive active material. For example, when an amount of the second positive active material exceeds wt %, a balance in the lithium solubility with the first positive active material is broken, so that a trade-off characteristic in which cycle-life characteristics are improved but the capacity and efficiency are deteriorated may appear.

Positive Electrode

In one or more embodiments, a positive electrode including the aforementioned positive active material for a rechargeable lithium battery is provided. The positive electrode for the rechargeable lithium battery may include a current collector and a positive active material layer on the current collector, and the positive active material layer may include the aforementioned positive active material, and may further include a binder and/or a conductive material.

The binder improves binding properties of positive active material particles with one another and with a current collector. Examples of the binder may be polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and/or the like, but are not limited thereto.

An amount of the binder in the positive active material layer may be about 1 wt % to about 5 wt % based on the total weight of the positive active material layer.

A conductive material may be included to provide electrode conductivity. Any electrically conductive material may be utilized as a conductive material unless it causes a chemical change. Non-limiting examples of the conductive material may include a carbon-based material such as natural graphite, artificial graphite, carbon black, acetylene black, ketjen black, a carbon fiber, a carbon nanofiber, carbon nanotube, and/or the like; a metal-based material of a metal powder or a metal fiber including copper, nickel, aluminum, silver, and/or the like; a conductive polymer such as a polyphenylene derivative; or a mixture thereof.

In the positive active material layer, an amount of the conductive material may be about 1 wt % to about 5 wt % based on the total weight of the positive active material layer.

In one or more embodiments, an aluminum foil may be utilized as the positive current collector, but the present disclosure is not limited thereto.

Rechargeable Lithium Battery

One or more embodiments of the present disclosure further provide a rechargeable lithium battery including a positive electrode including the aforementioned positive active material and a negative electrode, a separator between the positive electrode and the positive electrode, and an electrolyte.

FIG. 1 is a schematic view illustrating a rechargeable lithium battery according to one or more embodiments. Referring to FIG. 1, a rechargeable lithium battery 100 may include a battery cell including a positive electrode 114, a negative electrode 112 facing the positive electrode 114, a separator 113 between the positive electrode 114 and the negative electrode 112, and an electrolyte for a rechargeable lithium battery impregnating the positive electrode 114, the negative electrode 112, and the separator 113, a battery case 120 housing the battery cell, and a sealing member 140 sealing the battery case 120.

The negative electrode for a rechargeable lithium battery may include a current collector and a negative active material layer on the current collector. The negative active material layer may include a negative active material, and may further include a binder and/or a conductive material.

The negative active material may include a material that reversibly intercalates/deintercalates lithium ions, a lithium metal, a lithium metal alloy, a material capable of doping/dedoping lithium, and/or transition metal oxide.

The material that reversibly intercalates/deintercalates lithium ions may include, for example crystalline carbon, amorphous carbon, or a combination thereof as a carbon-based negative active material. The crystalline carbon may be non-shaped (e.g., irregularly shaped), or sheet, flake, spherical, or fiber shaped natural graphite or artificial graphite. The amorphous carbon may be a soft carbon, a hard carbon, a mesophase pitch carbonization product, calcined coke, and/or the like.

The lithium metal alloy includes an alloy of lithium and at least one metal selected from sodium (Na), potassium (K), rubidium (Rb), cesium (Cs), francium (Fr), beryllium (Be), magnesium (Mg), calcium (Ca), strontium (Sr), silicon (Si), antimony (Sb), lead (Pb), indium (In), zinc (Zn), barium (Ba), radium (Ra), germanium (Ge), aluminum (Al), and tin (Sn).

The material capable of doping/dedoping lithium may be a Si-based negative active material or a Sn-based negative active material. The Si-based negative active material may include silicon, a silicon-carbon composite, $SiO_x$ ($0<x<2$), a Si-Q alloy (wherein Q is an alkali metal, an alkaline-earth metal, a Group 13 element, a Group 14 element, a Group 15 element, a Group 16 element, a transition metal, a rare earth element, or a combination thereof, but not Si) and the Sn-based negative active material may include Sn, $SnO_2$, Sn—R alloy (wherein R is an alkali metal, an alkaline-earth metal, a Group 13 element, a Group 14 element, a Group 15 element, a Group 16 element, a transition metal, a rare earth element, or a combination thereof, but not Sn). At least one of these materials may be mixed with $SiO_2$. The elements Q and R may be selected from magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubium (db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), thallium (TI), germanium (Ge), phosphorous (P), arsenic (As), antimony (Sb), bismuth (Bi), sulfur (S), selenium (Se), tellurium (Te), polonium (Po), and a combination thereof.

The silicon-carbon composite may be, for example, a silicon-carbon composite including a core including crystalline carbon and silicon particles and an amorphous carbon coating layer disposed on the surface of the core. The crystalline carbon may be artificial graphite, natural graphite, or a combination thereof. An amorphous carbon precursor may be a coal-based pitch, mesophase pitch, petroleum-based pitch, coal-based oil, petroleum-based heavy oil, and/or a polymer resin such as a phenol resin, a furan resin, or a polyimide resin. In some embodiments, the amount of silicon may be about 10 wt % to about 50 wt % based on the total weight of the silicon-carbon composite. In some embodiments, the amount of the crystalline carbon may be about 10 wt % to about 70 wt % based on the total weight of the silicon-carbon composite, and the amount of the amorphous carbon may be about 20 wt % to about 40 wt % based on the total weight of the silicon-carbon composite. In some embodiments, a thickness of the amorphous carbon coating layer may be about 5 nm to about 100 nm. An average particle diameter (D50) of the silicon particles may be about 10 nm to about 20 μm. The average particle diameter (D50) of the silicon particles may be about 10 nm to about 200 nm. The silicon particles may exist in an oxidized form. For example, in one or more embodiments, an atomic amount ratio of Si:O in the silicon particles indicating a degree of oxidation may be a weight ratio of about 99:1 to about 33:67. The silicon particles may be $SiO_x$ particles, and for example, the range of x in $SiO_x$ may be greater than about 0 and less than about 2. In the present disclosure, unless otherwise defined, an average particle diameter (D50) indicates a particle where an accumulated volume is about 50 volume % in a particle distribution.

The Si-based negative active material or Sn-based negative active material may be mixed with the carbon-based negative active material. When the Si-based negative active material or Sn-based negative active material and the carbon-based negative active material are mixed and utilized, the mixing ratio may be a weight ratio of about 1:99 to about 90:10.

In the negative active material layer, the negative active material may be included in an amount of about 95 wt % to about 99 wt % based on the total weight of the negative active material layer.

In one or more embodiments, the negative active material layer may further include a binder, and may optionally further include a conductive material. An amount of the binder in the negative active material layer may be about 1 wt % to about 5 wt % based on the total weight of the negative active material layer. In some embodiments, when the conductive material is further included, the negative active material layer may include about 90 wt % to about 98 wt % of the negative active material, about 1 wt % to about 5 wt % of the binder, and about 1 wt % to about 5 wt % of the conductive material.

The binder serves to well adhere the negative active material particles to each other and to adhere the negative active material to the current collector. The binder may be a water-insoluble binder, a water-soluble binder, or a combination thereof.

Non-limiting examples of the water-insoluble binder may include polyvinyl chloride, carboxylated polyvinyl chloride, polyvinyl fluoride, an ethylene oxide-containing polymer, an ethylene propylene copolymer, polystyrene, polyvinylpyrrolidone, polyurethane, polytetrafluoro ethylene, polyvinylidene fluoride, polyethylene, polypropylene, polyamide-imide, polyimide, or a combination thereof.

The water-soluble binder may include a rubber binder or a polymer resin binder. The rubber binder may be selected from a styrene-butadiene rubber, an acrylated styrene-butadiene rubber, an acrylonitrile-butadiene rubber, an acrylic rubber, a butyl rubber, a fluororubber, and a combination thereof. The polymer resin binder may be selected from polyethylene oxide, polyvinylpyrrolidone, polyepichlorohydrin, polyphosphazene, polyacrylonitrile, an ethylene propylene diene copolymer, polyvinylpyridine, chlorosulfonated polyethylene, latex, a polyester resin, an acrylic resin, a phenol resin, an epoxy resin, polyvinyl alcohol, and a combination thereof.

When a water-soluble binder is utilized as the negative electrode binder, it may further include a cellulose-based compound capable of imparting viscosity as a type or kind of thickener. As the cellulose-based compound, one or more of carboxymethyl cellulose, hydroxypropylmethyl cellulose, methyl cellulose, or alkali metal salts thereof may be mixed and utilized. As the alkali metal, Na, K, and/or Li may be utilized. An amount of the thickener utilized may be about 0.1 parts by weight to about 3 parts by weight based on 100 parts by weight of the negative active material.

The conductive material may be included to provide electrode conductivity. Any electrically conductive material may be utilized as a conductive material unless it causes a chemical change. Non-limiting examples of the conductive material may include a carbon-based material such as natural graphite, artificial graphite, carbon black, acetylene black, ketjen black, a carbon fiber, a carbon nanofiber, carbon nanotube, and/or the like; a metal-based material of a metal powder or a metal fiber including copper, nickel, aluminum silver, and/or the like; a conductive polymer such as a polyphenylene derivative; or a mixture thereof.

The negative current collector may include one selected from a copper foil, a nickel foil, a stainless steel foil, a titanium foil, a nickel foam, a copper foam, a polymer substrate coated with a conductive metal, and a combination thereof.

The electrolyte may include a non-aqueous organic solvent and a lithium salt.

The non-aqueous organic solvent serves as a medium for transmitting ions taking part in the electrochemical reaction of a battery. The non-aqueous organic solvent may be a carbonate-based, ester-based, ether-based, ketone-based, or alcohol-based solvent, or aprotic solvent. Non-limiting examples of the carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and/or the like. Non-limiting examples of the ester-based solvent may include methyl acetate, ethyl acetate, n-propyl acetate, dimethyl acetate, methyl propionate, ethyl propionate, γ-butyrolactone, decanolide, valerolactone, mevalonolactone, caprolactone, and/or the like. The ether-based solvent may be dibutyl ether, tetraglyme, diglyme, dimethoxyethane, 2-methyltetrahydrofuran, tetrahydrofuran, and/or the like, and the ketone-based solvent may be cyclohexanone, and/or the like. In some embodiments, the alcohol-based solvent may be ethyl alcohol, isopropyl alcohol, etc., and the aprotic solvent may be nitriles such as R—CN (where R is a C2 to C20 linear, branched, or cyclic hydrocarbon group and may include a double bond, an aromatic ring, or an ether bond), amides such as dimethylformamide, dioxolanes such as 1,3-dioxolane, sulfolanes, and/or the like.

The non-aqueous organic solvent may be utilized alone or in a mixture. When the non-aqueous organic solvent is utilized in a mixture, the mixture ratio may be controlled or selected in accordance with a desirable battery performance.

In some embodiments, the carbonate-based solvent, a mixture of a cyclic carbonate, and a chain carbonate may be utilized. In one embodiment, when the cyclic carbonate and the chain carbonate are mixed in a volume ratio of about 1:1 to about 1:9, the electrolyte may exhibit excellent or suitable performance.

The non-aqueous organic solvent may further include an aromatic hydrocarbon-based organic solvent in addition to the carbonate-based solvent. In one or more embodiments, the carbonate-based solvent and the aromatic hydrocarbon-based organic solvent may be mixed in a volume ratio of about 1:1 to about 30:1.

As the aromatic hydrocarbon-based solvent, an aromatic hydrocarbon-based compound represented by Chemical Formula I may be utilized.

Chemical Formula I

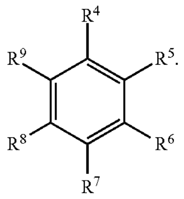

In Chemical Formula I, $R^4$ to $R^9$ may each independently be the same or different and be selected from hydrogen, a halogen, a C1 to C10 alkyl group, and a C1 to C10 haloalkyl group.

Non-limiting examples of the aromatic hydrocarbon-based solvent may be selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The electrolyte may further include vinylene carbonate or an ethylene carbonate-based compound of Chemical Formula II in order to improve cycle-life of a rechargeable lithium battery.

Chemical Formula II

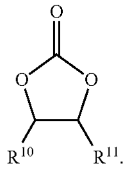

In Chemical Formula II, $R^{10}$ and $R^{11}$ may each independently be the same or different, and be selected from hydrogen, a halogen, a cyano group, a nitro group, and fluorinated C1 to C5 alkyl group, provided that at least one of $R^{10}$ and $R^{11}$ is selected from a halogen, a cyano group, a nitro group, and fluorinated C1 to C5 alkyl group, but both (e.g., simultaneously) of $R^{10}$ and $R^{11}$ are not hydrogen.

Non-limiting examples of the ethylene carbonate-based compound may be difluoro ethylenecarbonate, chloroethylene carbonate, dichloroethylene carbonate, bromoethylene carbonate, dibromoethylene carbonate, nitroethylene carbonate, cyanoethylene carbonate, or fluoroethylene carbonate. An amount of an additive such as an ethylene carbonate-based compound for improving cycle-life may be utilized within an appropriate or suitable range.

The lithium salt dissolved in the non-aqueous organic solvent supplies lithium ions in a rechargeable lithium battery, enables a basic operation of the rechargeable lithium battery, and improves transportation of the lithium ions between positive and negative electrodes.

Non-limiting examples of the lithium salt may include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $Li(FSO_2)_2N$ (lithium bis(fluorosulfonyl)imide, LiFSI), $LiC_4F_9SO_3$, $LiClO_4$, $LiAlO_2$, $LiAlCl_4$, $LiPO_2F_2$, $LiN(C_xF_{2x+1}SO_2)(C_yF_{2y+1}SO_2)$, wherein x and y are natural numbers, for example, x and y are each an integer in a range of 1 to 20, lithium difluoro(bisoxalato) phosphate, LiCl, LiI, $LiB(C_2O_4)_2$ (lithium bis(oxalato) borate, LiBOB), and lithium difluoro(oxalato)borate (LiDFOB).

The lithium salt may be utilized in a concentration in a range of about 0.1 M to about 2.0 M. When the lithium salt is included at the above concentration range, an electrolyte may have excellent or suitable performance and lithium ion mobility due to optimal or suitable electrolyte conductivity and viscosity.

The separator 113 separates a positive electrode 114 and a negative electrode 112 and provides a transporting passage for lithium ions and may be any generally-utilized separator in a lithium ion battery. In other words, it may have low resistance to ion transport and excellent or suitable impregnation for an electrolyte. For example, the separator may be selected from a glass fiber, polyester, polyethylene, polypropylene, polytetrafluoroethylene, or a combination thereof. It may have a form of a non-woven fabric or a woven fabric. For example, in a lithium ion battery, a polyolefin-based polymer separator such as polyethylene and polypropylene is mainly utilized. In some embodiments, to ensure the heat resistance or mechanical strength, a coated separator including a ceramic component or a polymer material may be utilized. Optionally, it may have a mono-layered or multi-layered structure.

Rechargeable lithium batteries may be classified as lithium ion batteries, lithium ion polymer batteries, and lithium polymer batteries according to the presence of a separator and the type or kind of electrolyte utilized therein. The rechargeable lithium batteries may have a variety of shapes and sizes, and may include cylindrical, prismatic, coin, or pouch-type or kind batteries, and may be thin film batteries or may be rather bulky in size. Structures and manufacturing methods for lithium ion batteries pertaining to this disclosure are those suitable in the art.

The rechargeable lithium battery according to one or more embodiments of the present disclosure may be utilized in an electric vehicle (EV), a hybrid electric vehicle such as a plug-in hybrid electric vehicle (PHEV), and a portable electronic device because it implements a high capacity and has excellent or suitable storage stability, cycle-life characteristics, and high rate characteristics at high temperatures.

Hereinafter, examples of the present disclosure and comparative examples are described. It is to be understood, however, that the examples are for the purpose of illustration and are not to be construed as limiting the present disclosure.

Example 1

(1) Preparation of Positive Active Material 80 wt % of a first positive active material in the form of a secondary particle into which a plurality of primary particles are aggregated and having a composition of $LiNi_{0.75}Mn_{0.22}Al_{0.03}O_2$ and 20 wt % of a second positive active material in the form of a single particle and having a composition of $LiNi_{0.80}Mn_{0.20}O_2$ were mixed to prepare a positive active material.

Figure 2:
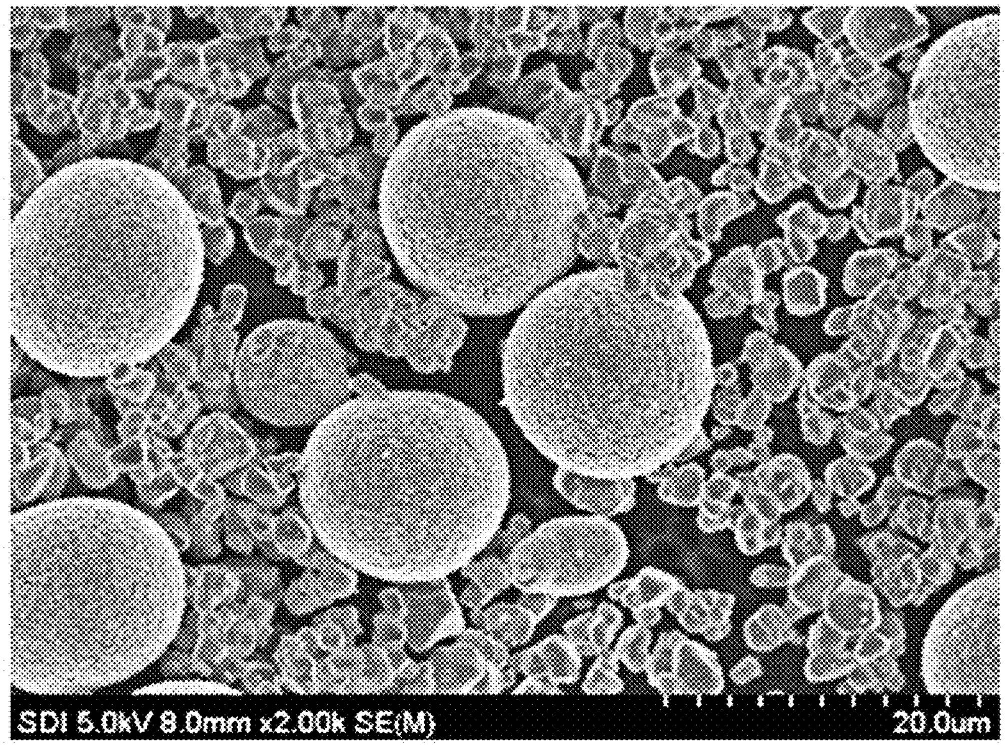
FIGS. 2 and 3 are scanning electron microscope images of a positive active material of Example 1 according to one or more embodiments of the present disclosure.
Figure 3:
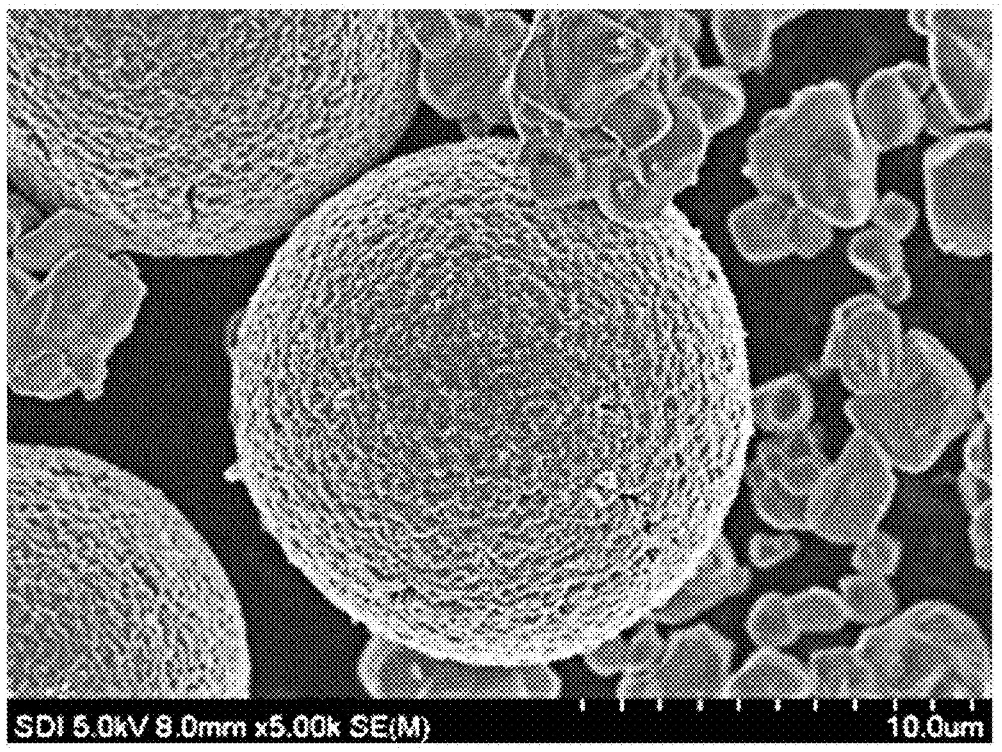

FIGS. 2 and 3 shows scanning electron microscope images of the positive active material of Example 1. Referring to FIGS. 2 and 3, the first positive active material in the form of a secondary particle turns out to be mixed with the second positive active material in the form of a single particle. The first positive active material has an average particle diameter (D50) of about 12 μm, and the second positive active material has an average particle diameter (D50) of about 2.5 μm or so. In the composition of Example 1, a nickel concentration (80 mol %) of the second positive active material is designed to be higher by about 5 mol % than a nickel concentration (75 mol %) of the first positive active material.

(2) Manufacture of Positive Electrode 95 wt % of the prepared positive active material, 3 wt % of a polyvinylidene fluoride binder, and 2 wt % of a carbon nanotube conductive material were mixed in an N-methylpyrrolidone solvent to prepare positive active material slurry. The positive active material slurry was coated on an aluminum current collector and then, dried and compressed to manufacture a positive electrode.

(3) Manufacture of Rechargeable Lithium Battery Cell

The positive electrode and a lithium metal counter electrode were utilized, a separator with a polyethylene polypropylene multi-layer structure was interposed therebetween, and then, an electrolyte solution prepared by adding 1.0 M $LiPF_6$ lithium salt in a mixed solvent of ethylene carbonate and diethyl carbonate in a volume ratio of 50:50 in a volume ratio was injected thereinto, to manufacture a coin half-cell.

Example 2

The same first positive active material as utilized in Example 1 was utilized, but a second positive active material having a composition of $LiNi_{0.80}Mn_{0.20}O_2$ and an average particle diameter (D50) of about 4 μm in the form of a single particle was utilized.

This positive active material was utilized in substantially the same manner as in Example 1, to manufacture a positive electrode and a rechargeable lithium battery cell.

Comparative Example 1

Figure 4:
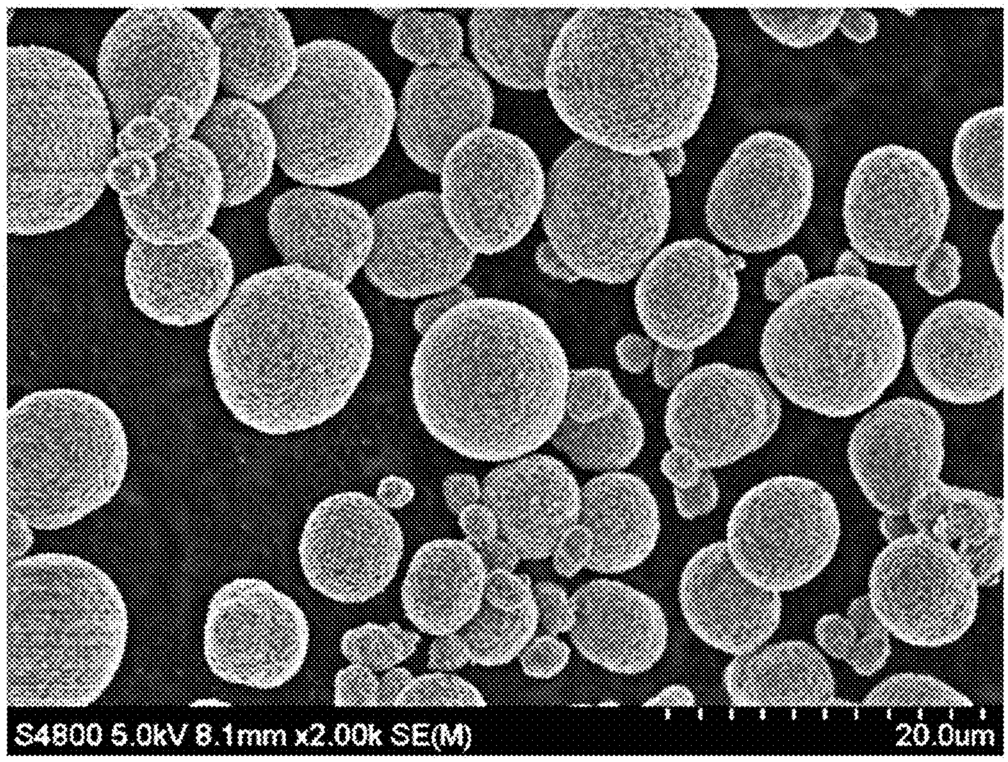
FIGS. 4 and 5 are scanning electron microscope images of a positive active material of Comparative Example 1 according to one or more embodiments of the present disclosure.
Figure 5:
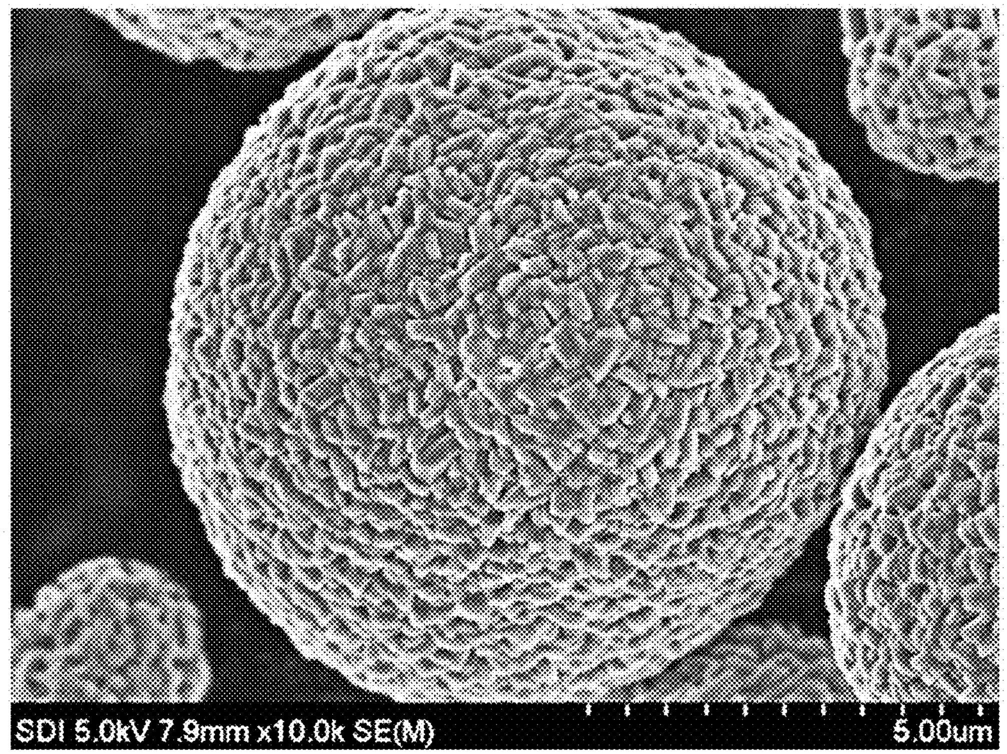

The same first positive active material as utilized in Example 1 was utilized, but a second positive active material having a composition of $LiNi_{0.80}Mn_{0.20}O_2$ composition in the form of a secondary particle was utilized. FIGS. 4 and 5 are scanning electron microscope images showing the positive active material of Comparative Example 1. Referring to FIGS. 4 and 5, the first positive active material (large particles) in the form of a secondary particle and the second positive active material (small particles) in the form of a secondary particle are mixed. In Comparative Example 1, the first positive active material has an average particle diameter (D50) of about 12 μm, and the second positive active material has an average particle diameter (D50) of about 2.5 μm or so.

The positive active material was applied in substantially the same manner as in Example 1 to manufacture a positive electrode and a rechargeable lithium battery cell.

Comparative Example 2

The same first positive active material as utilized in Example 1 was utilized, but a second positive active material having a composition of $LiNi_{0.75}Mn_{0.25}O_2$ and an average particle diameter (D50) of about 4 μm in the form of a single particle was utilized. In the composition of Comparative Example 2, the nickel concentration of the first positive active material and the nickel concentration of the second positive active material are at substantially the same level.

This positive active material was applied in substantially the same manner as in Example 1 to manufacture a positive electrode and a rechargeable lithium battery cell.

Comparative Example 3

A first positive active material having a composition of $LiNi_{0.80}Mn_{0.18}Al_{0.02}O_2$ and an average particle diameter (D50) of about 12 μm was utilized, and a second positive active material having a composition of $LiNi_{0.75}Mn_{0.25}O_2$ and an average particle diameter (D50) of about 4 μm in the form of a single particle was utilized. In the composition of Comparative Example 3, the nickel concentration of the second positive active material is designed to be about 5 mol % lower than that of the first positive active material. This positive active material was applied in substantially the same manner as in Comparative Example 2 to manufacture a positive electrode and a rechargeable lithium battery cell.

Evaluation Example: Charge/Discharge Capacity and High-Temperature Cycle-Life Characteristics Each coin half-cell according to Example 1 and Comparative Examples 1 to 3 was charged at a constant current (0.2 C) and a constant voltage (4.25 V, 0.05 C cut-off), paused for 10 minutes, and discharged to 3.0 V at a constant current (0.2 C) to perform initial charge and discharge. The cells were measured with respect to initial charge capacity and initial discharge capacity, and the results are shown in Table 1, and a ratio of the initial discharge capacity to the initial charge capacity was calculated to obtain efficiency, and the results are shown in Table 1.

After the initial charge and discharge, 50 times' charges and discharges were repeated at an elevated temperature of 45° C. at 1 C. A ratio of capacity at each cycle to the initial discharge capacity for the 50 cycles was calculated to obtain capacity retention, which is shown in FIG. 6, and a ratio of $50^{th}$ discharge capacity to the initial discharge capacity is evaluated, and the results are shown in Table 1.

TABLE 1

| | Example 1 | Example 2 | Comparative Example 1 | Comparative Example 2 | Comparative Example 3 |
|---|---|---|---|---|---|
| Charge capacity (mAh/g) | 236.8 | 236.5 | 237.5 | 232.5 | 244.3 |
| Discharge capacity (mAh/g) | 204.1 | 203.4 | 204.2 | 196.5 | 205.2 |
| Efficiency (%) | 86.2 | 86.0 | 86.0 | 84.5 | 84.0 |
| High-temperature cycle-life (@50 cycles, %) | 95.2 | 95.4 | 89.0 | 92.2 | 91.0 |

Figure 6:
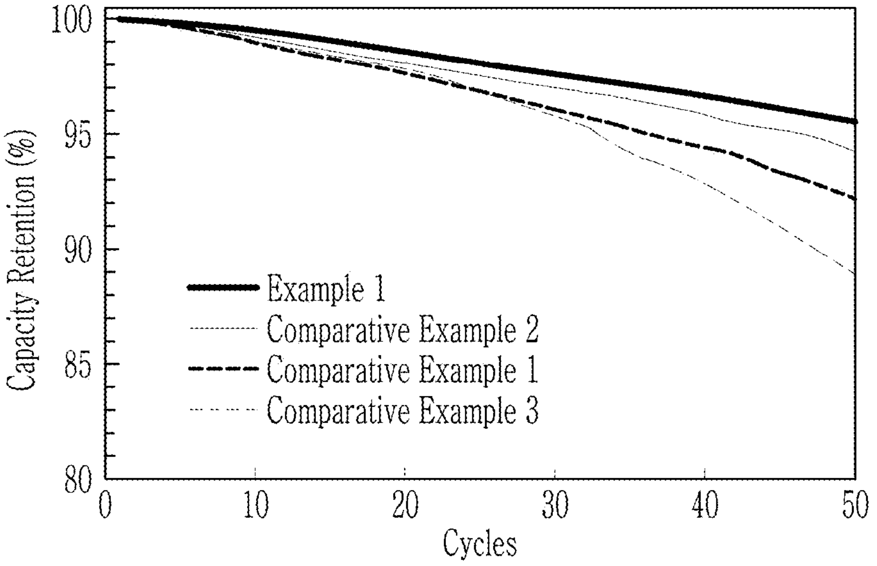
FIG. 6 is a graph showing high-temperature cycle-life characteristics of battery cells manufactured in Example 1 and Comparative Examples 1 to 3 according to one or more embodiments of the present disclosure.

Referring to Table 1 and FIG. 6, Comparative Example 1, in which the second positive active material is in the form of a secondary particle and has the same nickel concentration level as that of the first positive active material, exhibits deteriorated high-temperature cycle-life characteristics, compared with Example 1. In addition, Comparative Example 2, in which the second positive active material is in the form of a single particle and has the same nickel concentration level as that of the first positive active material, exhibits deteriorated initial discharge capacity and efficiency and just slightly improved cycle-life. Comparative Example 3, in which the second positive active material is in the form of a single particle and has a lower nickel concentration than that of the first positive active material, exhibits deteriorated initial charge and discharge efficiency and also, deteriorated high-temperature cycle-life characteristics. In contrast, Example 1 exhibits high capacity and efficiency and concurrently (e.g., simultaneously), excellent or suitable high-temperature cycle-life characteristics.

As used herein, the terms "substantially," "about," and similar terms are used as terms of approximation and not as terms of degree, and are intended to account for the inherent deviations in measured or calculated values that would be recognized by those of ordinary skill in the art. "About", "substantially", or "approximately," as used herein, is also inclusive of the stated value (or characteristic, e.g., spherical) and means within an acceptable range of deviation for the particular value (or characteristic) as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

While the present disclosure has been described in connection with what is presently considered to be practical example embodiments, it is to be understood that the present disclosure is not limited to the disclosed embodiments. In contrast, it is intended to cover one or more suitable modifications and equivalent arrangements included within the spirit and scope of the appended claims and equivalent thereof.

| Reference Numerals: | |
|---|---|
| 100: rechargeable lithium battery | 112: negative electrode |
| 113: separator | 114: positive electrode |
| 120: battery case | 140: sealing member |

What is claimed is:

1. A positive active material for a rechargeable lithium battery, the positive active material comprising a first positive active material comprising a layered cobalt-free lithium nickel-based composite oxide, being in a form of a secondary particle in which a plurality of primary particles are aggregated, and having an average particle diameter (D50) of about 8 μm to about 20 μm; and a second positive active material comprising a layered cobalt-free lithium nickel-based composite oxide, being in a form of a single particle, and having an average particle diameter (D50) of about 1 μm to about 7 μm, wherein a difference of a molar amount of nickel based on a total molar amount of elements excluding lithium and oxygen in the first positive active material subtracted from a molar amount of nickel based on a total molar amount of elements excluding lithium and oxygen in the second positive active material is about 1 mol % to about 10 mol %.

2. The positive active material of claim 1, wherein the average particle diameter (D50) of the second positive active material is about 2 μm to about 5 μm.

3. The positive active material of claim 1, wherein the layered cobalt-free lithium nickel-based composite oxide of the first positive active material is represented by Chemical Formula 1, and the layered cobalt-free lithium nickel-based composite oxide of the second positive active material is represented by Chemical Formula 2:

[Chemical Formula 1]

$$Li_{x1}Ni_{a1}Mn_{b1}M^1_{(1-a1-b1)}O_2$$

wherein, in Chemical Formula 1, $M^1$ is at least one element selected from Al, B, Ba, Ca, Ce, Cr, Cu, F, Fe, Mg, Mo, Nb, P, S, Si, Sr, Ti, V, W, and Zr, $0.9 \leq x1 \leq 1.2$, $0.6 \leq a1 \leq 1$, and $0 \leq b1 \leq 0.4$,

[Chemical Formula 2]

$$Li_{x2}Ni_{a2}Mn_{b2}M^2_{(1-a2-b2)}O_2$$

wherein, in Chemical Formula 2, $M^2$ is at least one element selected from Al, B, Ba, Ca, Ce, Cr, Cu, F, Fe, Mg, Mo, Nb, P, S, Si, Sr, Ti, V, W, and Zr, $0.9 \leq x2 \leq 1.2$, $0.6 \leq a2 \leq 1$, and $0 \leq b2 \leq 0.4$, and $0.02 \leq (a2-a1) \leq 0.10$.

4. The positive active material of claim 1, wherein the difference of the molar amount of nickel based on the total molar amount of elements excluding lithium and oxygen in the first positive active material subtracted from the molar amount of nickel based on the total molar amount of elements excluding lithium and oxygen in the second positive active material is about 1 mol % to about 8 mol %.

5. The positive active material of claim 1, wherein the first positive active material has a substantially spherical shape, and the second positive active material has a polyhedral shape, a substantially spherical shape, and/or an irregular shape.

6. The positive active material of claim 1, wherein the positive active material for the rechargeable lithium battery comprises about 65 wt % to about 95 wt % of the first positive active material and about 5 wt % to about 35 wt % of the second positive active material.

7. The positive active material of claim 6, wherein the positive active material for the rechargeable lithium battery comprises about 65 wt % to about 90 wt % of the first positive active material and about 10 wt % to about 35 wt % of the second positive active material.

8. A positive electrode for a rechargeable lithium battery, the positive electrode comprising a current collector and a positive active material layer on the current collector, wherein the positive active material layer comprises the positive active material of claim 1.

9. The positive electrode of claim 8, wherein the average particle diameter (D50) of the second positive active material is about 2 μm to about 5 μm.

10. The positive electrode of claim 8, wherein the layered cobalt-free lithium nickel-based composite oxide of the first positive active material is represented by Chemical Formula 1, and the layered cobalt-free lithium nickel-based composite oxide of the second positive active material is represented by Chemical Formula 2:

[Chemical Formula 1]

$$Li_{x1}Ni_{a1}Mn_{b1}M^1_{(1-a1-b1)}O_2$$

wherein, in Chemical Formula 1, $M^1$ is at least one element selected from Al, B, Ba, Ca, Ce, Cr, Cu, F, Fe, Mg, Mo, Nb, P, S, Si, Sr, Ti, V, W, and Zr, $0.9 \leq x1 \leq 1.2$, $0.6 \leq a1 \leq 1$, and $0 \leq b1 \leq 0.4$,

[Chemical Formula 2]

$$Li_{x2}Ni_{a2}Mn_{b2}M^2_{(1-a2-b2)}O_2$$

wherein, in Chemical Formula 2, $M^2$ is at least one element selected from Al, B, Ba, Ca, Ce, Cr, Cu, F, Fe, Mg, Mo, Nb, P, S, Si, Sr, Ti, V, W, and Zr, $0.9 \leq x2 \leq 1.2$, $0.6 \leq a2 \leq 1$, and $0 \leq b2 \leq 0.4$, and $0.02 \leq (a2-a1) \leq 0.10$.

11. The positive electrode of claim 8, wherein the difference of the molar amount of nickel based on the total molar amount of elements excluding lithium and oxygen in the first positive active material subtracted from the molar amount of nickel based on the total molar amount of elements excluding lithium and oxygen in the second positive active material is about 1 mol % to about 8 mol %.

12. The positive electrode of claim 8, wherein the positive active material comprises about 65 wt % to about 95 wt % of the first positive active material and about 5 wt % to about 35 wt % of the second positive active material.

13. The positive electrode of claim 8, wherein the first positive active material has a substantially spherical shape, and the second positive active material has a polyhedral shape, a substantially spherical shape, and/or an irregular shape.

14. The positive electrode of claim 9, wherein the positive active material comprises about 65 wt % to about 90 wt % of the first positive active material and about 10 wt % to about 35 wt % of the second positive active material.

15. A rechargeable lithium battery comprising:

the positive electrode of claim 8;

a negative electrode; and an electrolyte.

16. The rechargeable lithium battery of claim 15, wherein the average particle diameter (D50) of the second positive active material is about 2 μm to about 5 μm.

17. The rechargeable lithium battery of claim 15, wherein the layered cobalt-free lithium nickel-based composite oxide of the first positive active material is represented by Chemical Formula 1, and the layered cobalt-free lithium nickel-based composite oxide of the second positive active material is represented by Chemical Formula 2:

[Chemical Formula 1]

$$Li_{x1}Ni_{a1}Mn_{b1}M^1_{(1-a1-b1)}O_2$$

wherein, in Chemical Formula 1, $M^1$ is at least one element selected from Al, B, Ba, Ca, Ce, Cr, Cu, F, Fe, Mg, Mo, Nb, P, S, Si, Sr, Ti, V, W, and Zr, $0.9 \leq x1 \leq 1.2$, $0.6 \leq a1 \leq 1$, and $0 \leq b1 \leq 0.4$,

[Chemical Formula 2]

$$Li_{x2}Ni_{a2}Mn_{b2}M^2_{(1-a2-b2)}O_2$$

wherein, in Chemical Formula 2, $M^2$ is at least one element selected from Al, B, Ba, Ca, Ce, Cr, Cu, F, Fe, Mg, Mo, Nb, P, S, Si, Sr, Ti, V, W, and Zr, $0.9 \leq x2 \leq 1.2$, $0.6 \leq a2 \leq 1$, and $0 \leq b2 \leq 0.4$, and $0.02 \leq (a2-a1) \leq 0.10$.

18. The rechargeable lithium battery of claim 15, wherein the difference of the molar amount of nickel based on the total molar amount of elements excluding lithium and oxygen in the first positive active material subtracted from the molar amount of nickel based on the total molar amount of elements excluding lithium and oxygen in the second positive active material is about 1 mol % to about 8 mol %.

19. The rechargeable lithium battery of claim 15, wherein the positive active material comprises about 65 wt % to about 95 wt % of the first positive active material and about 5 wt % to about 35 wt % of the second positive active material.

20. The rechargeable lithium battery of claim 15, wherein the first positive active material has a substantially spherical shape, and the second positive active material has a polyhedral shape, a substantially spherical shape, and/or an irregular shape.

21. The positive active material of claim 1, wherein:

the second positive active material is selected from a monolithic structure, a non-aggregated particle, a monolith structure, and a monocrystalline particle;

the difference of the molar amount of nickel based on the total molar amount of elements excluding lithium and oxygen in the first positive active material subtracted from that in the second positive active material is about 3 mol % to about 8 mol %; and the positive active material comprises about 70 wt % to about 80 wt % of the first positive active material and about 20 wt % to about 30 wt % of the second positive active material.

* * * * *